United States Patent
Hu (10) Patent No.: US 11,209,914 B1
(45) Date of Patent: Dec. 28, 2021

(54) METHOD AND APPARATUS FOR DETECTING ORIENTATION OF ELECTRONIC DEVICE, AND STORAGE MEDIUM

(71) Applicant: BEIJING XIAOMI MOBILE SOFTWARE CO., LTD., Beijing (CN)

(72) Inventor: Xiankun Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/099,669

(22) Filed: Nov. 16, 2020

(30) Foreign Application Priority Data

Jun. 30, 2020 (CN) .......................... 202010622642.0

(51) Int. Cl.
*G06F 3/0338* (2013.01)
*G06F 3/0346* (2013.01)
*G06F 3/044* (2006.01)

(52) U.S. Cl.
CPC .......... *G06F 3/0346* (2013.01); *G06F 3/0338* (2013.01); *G06F 3/044* (2013.01); *G06F 2203/04102* (2013.01)

(58) Field of Classification Search
CPC ............................................ G06F 2203/04102
See application file for complete search history.

(56) References Cited

U.S. PATENT DOCUMENTS

| 10,712,862 | B1* | 7/2020 | Kang | G06F 1/1677 |
| 2015/0026623 | A1* | 1/2015 | Horne | G06F 3/04883 |
| | | | | 715/771 |
| 2017/0185170 | A1* | 6/2017 | Magi | G06F 1/1641 |
| 2017/0185289 | A1* | 6/2017 | Kim | G06F 1/1641 |
| 2017/0285837 | A1* | 10/2017 | Zeng | G06F 1/1643 |
| 2020/0125194 | A1* | 4/2020 | Jiang | G06F 1/1643 |
| 2021/0132730 | A1* | 5/2021 | Huang | G06F 3/038 |

OTHER PUBLICATIONS

European Patent Office, Extended European Search Report (EESR) in Application No. 21151384.1 dated Jun. 25, 2021.

* cited by examiner

*Primary Examiner* — Ryan A Lubit
(74) *Attorney, Agent, or Firm* — Syncoda LLC; Feng Ma (57) ABSTRACT

A method for detecting an orientation of an electronic apparatus can be applied to an electronic apparatus with a bendable flexible screen. The bendable flexible screen includes a touch array. The touch array includes at least two touch sensors. The method includes: determining whether a first type of detection data generated by mutual coupling between the at least two touch sensors is detected; and determining a current orientation of the electronic apparatus based on the first type of detection data.

12 Claims, 3 Drawing Sheets determining whether a first type of detection data generated by mutual coupling between the at least two touch sensors is detected — S101 determining a bending angle of the bendable flexible screen of the electronic device based on the first type of detection data — S201 determining the current posture of the electronic device based on the bending angle of the bendable flexible screen — S202

METHOD AND APPARATUS FOR DETECTING ORIENTATION OF ELECTRONIC DEVICE, AND STORAGE MEDIUM

CROSS-REFERENCE TO RELATED APPLICATION

This application claims priority to Chinese Patent Application No. 202010622642.0 filed on Jun. 30, 2020, the disclosure of which is hereby incorporated by reference in its entirety.

BACKGROUND

With the popularization and rapid development of smart electronic devices, various functions and structures appear in the electronic devices. An electronic device with a bendable flexible screen, such as a mobile phone, a tablet computer, a notebook computer and a wearable device, may also have variable structures and orientations due to the bending of the flexible screen, thereby improving diversities of styles, functions and scenes of the electronic device.

SUMMARY

The present disclosure relates to a field of electronic technologies, and more specifically to a method and an apparatus for detecting an orientation of an electronic device, and a storage medium.

According to embodiments of the present disclosure, there is provided a method for detecting an orientation of an electronic device. The method is applicable to an electronic device with a bendable flexible screen. The bendable flexible screen includes a touch array. The touch array includes at least two touch sensors. The method includes: determining whether a first type of detection data generated by mutual coupling between the at least two touch sensors is detected; and determining a current orientation of the electronic device based on the first type of detection data.

According to embodiments of the present disclosure, there is provided an apparatus for detecting an orientation of an electronic device. The apparatus is applicable to an electronic device with a bendable flexible screen. The bendable flexible screen includes a touch array. The touch array includes at least two touch sensors. The apparatus includes a non-transitory computer-readable medium including computer-executable instructions stored thereon, and an instruction execution system which is configured by the instructions to implement at least one of: a first determining module and a second determining module. The first determining module is configured to determine whether a first type of detection data generated by mutual coupling between the at least two touch sensors is detected. The second determining module is configured to determine a current orientation of the electronic device based on the first type of detection data.

According to embodiments of the present disclosure, there is provided a non-transitory computer readable storage medium having computer executable instructions stored thereon. When the computer executable instructions are executed by a processor, the processor is caused to implement a method for detecting an orientation of an electronic device. The method is applicable to an electronic device with a bendable flexible screen, the bendable flexible screen comprises a touch array, the touch array comprises at least two touch sensors, and the method may include: determining whether a first type of detection data generated by mutual coupling between the at least two touch sensors is detected; and determining a current orientation of the electronic device based on the first type of detection data.

It is to be understood that both the foregoing general description and the following detailed description are exemplary and explanatory only, and are not restrictive of the present disclosure, as claimed.

BRIEF DESCRIPTION OF THE DRAWINGS

The accompanying drawings, which are incorporated in and constitute a part of this disclosure, illustrate embodiments consistent with the present disclosure, and serve to explain the principle of the present disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the present disclosure as described in the appended claims.

For an electronic device with a variable orientation, when the orientation of the electronic device may not be automatically recognized, and a direction and a splitting screen of a display screen may not be adjusted accordingly in a using procedure, it may be difficult for a user to use the electronic device in different scenes. Various embodiments of the disclosure can address how to automatically detect the orientation of the electronic device.

Figure 1:
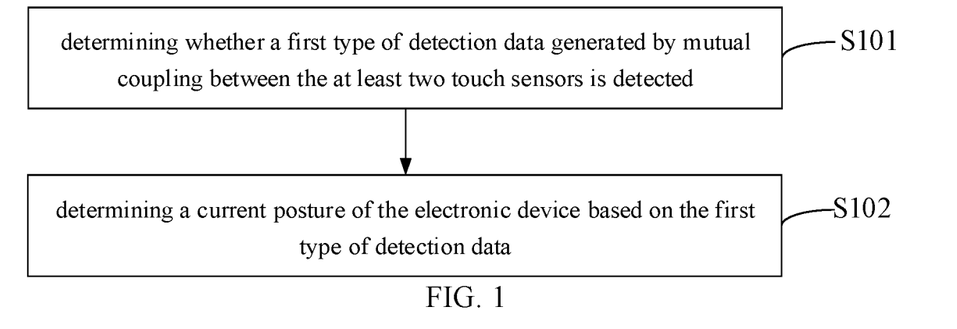
FIG. 1 is a flowchart illustrating a method for detecting an orientation of an electronic device according to some embodiments.

FIG. 1 is a flowchart illustrating a method for detecting an orientation of an electronic device according to some embodiments. As illustrated in FIG. 1, the method is applied to an electronic device with a bendable flexible screen. The bendable flexible screen includes a touch array. The touch array includes at least two touch sensors. The method can include the following operations.

At block S101, it is determined whether a first type of detection data generated by mutual coupling between the at least two touch sensors is detected.

At block S102, a current orientation of the electronic device is determined based on the first type of detection data.

In some embodiments of the present disclosure, the electronic device may be any electronic device with the bendable flexible screen. The orientation of the electronic device may be changed with bending of the bendable flexible screen. The electronic device includes, but is not limited to a mobile phone, a tablet computer, a notebook computer and a wearable electronic device such as an intelligent watch.

The bendable flexible screen is disposed to cover a surface of the electronic device. In a spread state of the bendable flexible screen, the surface on which the bendable flexible screen of the electronic device is located may form a plane, while in a bending state of the bendable flexible screen, the plane on which the bendable flexible screen of the electronic device is located may be divided into at least two planes with an angle between the at least two planes.

In some embodiments of the present disclosure, the first type of detection data is detection data generated by the mutual coupling between the at least two touch sensors. It should be understood that, detection data generated by touching of a touch body (such as, a finger or a stylus) is located at a small area of the bendable flexible screen, and a distribution position and enclosed figure of the touch body are irregular, while the detection data generated between the at least two touch sensors close to each other due to the bending of the bendable flexible screen has strong regularity. For example, the touch sensors are evenly distributed along a bending direction, and the closer the touch sensor to a bending area, the stronger a signal intensity corresponding to the detection data is. The touch body is a conductor. A signal intensity corresponding to detection data generated by direct touching with the bendable flexible screen surface is strong, while a signal generated by the mutual coupling between the at least two touch sensors is much smaller than a touch signal generated by the touch body. Therefore, the first type of detection data may be determined based on a feature of touch data detected by the touch sensor on the bendable flexible screen.

The above features of the touch data may include an electrical parameter detected by each touch sensor, a distribution rule of different electrical parameters, a coordinate position of each touch sensor that detects the electrical parameter, the number of touch sensors, and whether the touch sensors with a same or similar electrical parameters at the relative positions forming the coupling. The electrical parameter may be a signal parameter detected by the touch sensor, such as, a capacitance value and a change of the capacitance value detected by a capacitive touch sensor.

Correspondingly, the detection data generated by the touching of the touch body may be taken as a second type of detection data different from the first type of detection data for processing. In this way, an orientation detection of the electronic device may be realized based on the detection data of the touch sensor while an original touch function of the bendable flexible screen is kept unaffected.

The detection data generated by the touching of the touch body is different from the first type of detection data generated by the coupling in the distribution rule and the electrical parameter. For example, the electrical parameter corresponding to the touching of the touch body is greater than an electrical parameter threshold. However, the electrical parameter generated by the coupling is much weak, which is smaller than the electrical parameter threshold. Therefore, the first type of detection data may also be distinguished from the second type of detection data generated by the touching of the touch body by utilizing the electrical parameter.

In some embodiments, when the first type of detection data is not detected, it may be determined that the current orientation of the electronic device is in the spread state. When the first type of detection data is not detected, it is possible that the touch sensors in the bendable flexible screen of the electronic device are not coupled due to a long distance between the touch sensors. In this case, it may be determined that the current orientation of the electronic device is in the spread state. Of course, the current orientation of the electronic device may also be spread to be greater than or equal to 180° and less than or equal to 360°, that is, the current orientation may not be accurately determined. Therefore, in the embodiment of the present disclosure, when the first type of detection data is detected, the current orientation of the electronic device may be determined, such that a bending degree or angle of the bendable flexible screen may be accurately estimated, and a function of the orientation detection may be realized.

In some embodiments, determining whether the first type of detection data generated by the mutual coupling between the at least two touch sensors is detected includes: determining whether a distribution of electrical parameters generated by different touch sensors on the bendable flexible screen meets a distribution condition; and determining that the first type of detection data is detected in a case that the distribution of electrical parameters generated by different touch sensors on the bendable flexible screen meets the distribution condition.

The detection data may be the electrical parameter generated by the touch sensor on the bendable flexible screen sensing the conductor, including a capacitive electrical parameter or an inductive electrical parameter, such as a capacitance value or an inductance value. For example, a capacitive touch screen utilizes a change of the capacitance value caused by a conductor coupled on the surface of the touch sensor to determine whether there is a coupled touch body. Therefore, in some embodiments of the present disclosure, a distance relationship between the touch sensors may be determined by utilizing the change of the capacitance value caused by mutual coupling of capacitances between the touch sensors close to each other, and then the orientation of the electronic device may be determined.

It may be understood that, there is a certain distribution rule in the first type of detection data sensed by touch sensors at different distribution positions in the bending procedure of the bendable flexible screen. For example, in the bending area, electrical parameters detected by touch sensors distributed in parallel along a bending center line are approximately equal, while electrical parameters detected by touch sensors distributed in a direction perpendicular to the bending center line gradually decrease along a direction gradually far away from the bending center line. As another example, touch sensors symmetrically distributed at both sides of the bending center line are mutually coupled touch sensors, so the electrical parameters detected by the touch sensors at the both sides are approximately equal.

Therefore, in some embodiments of the present disclosure, the first type of detection data may be determined by determining whether the distribution rule of the detection data detected by each touch sensor meets a predetermined distribution condition, and then the first type of detection data may be distinguished from the second type of detection data including data generated by the touching of the touch body.

In some embodiments, determining whether the distribution of electrical parameters generated by different touch sensors on the bendable flexible screen meets the distribution condition includes: determining whether a change tendency of the electrical parameters is symmetrically distributed in a predetermined pattern based on electrical parameters of any adjacent touch sensors, the predetermined pattern including a line through two edges of the bendable flexible screen; and determining that the distribution of the electrical parameters on the bendable flexible screen meets the distribution condition in a case that the change tendency of the electrical parameters is symmetrically distributed in the predetermined pattern.

It should be understood that, after the bendable flexible screen is bent, an electrical parameter detected by the touch sensor closer to the bending area is relatively large because there are other touch sensors having a close distance with the touch sensor. However, an electrical parameter detected by a touch sensor closer to an edge area is smaller because the touch sensor is far away from the bending area and also far away from other coupled touch sensors. Meanwhile, the bendable flexible screen may be bent along the line through the two edges of the bendable flexible screen, and touch sensors at symmetrical positions at both sides of the line are coupled with each other and have approximately same electrical parameters.

The above-mentioned line is a rotation center when the bendable flexible screen is bent. When there is a rotation shaft for assisting the bending under the bendable flexible screen, the line may be a straight line extending along the rotation shaft. In addition, because the bendable flexible screen may be bent along a straight line and generate a bent angle, or may be bent to form an arc-shaped bent angle, the line where the bending center is located may also be a line with a slight bending. In the same way, the bendable flexible screen may be bent in an up-to-down/down-to-up direction, a left-to-right/right-to-left direction, or a diagonal direction (the up-to-down/down-to-up direction and the left-to-right direction/right-to-left are described based on a relative position of the electronic device, and an actual orientation is not limited). Therefore, the above line may be a line through two opposite edges, a line through two adjacent edges, or a line through two opposite corners of the bendable flexible screen.

Therefore, in some embodiments of the present disclosure, it may be determined whether the distribution condition is met according to the distribution of the electrical parameters of respective touch sensors with a change tendency in a descending order or an ascending order on the bendable flexible screen. When the change tendency of the electrical parameters is distributed correspondingly at the both sides of the line, it may be determined that the electrical parameters are detection data generated by the mutual coupling between the at least two touch sensors.

In this way, it may be determined whether the electrical parameters are the first type of detection data that may be used to determine the orientation of the electronic device based on the distribution rule of the electrical parameters detected by respective touch sensors on the bendable flexible screen, thereby distinguishing the second type of detection data generated by the touching of the touch body.

In some embodiments, determining that the distribution of the electrical parameters on the bendable flexible screen meets the distribution condition in the case that the change tendency of the electrical parameters is symmetrically distributed in the predetermined pattern includes: in a case that the change tendency of the electrical parameters is symmetrically distributed in the predetermined pattern, and a difference between electrical parameters of touch sensors with a same distance to the line is within a first threshold range, determining that the distribution of the electrical parameters on the bendable flexible screen meets the distribution condition.

Since the line where a center of the bending area of the bendable flexible screen is located runs through the two edges of the bendable flexible screen, the touch sensors at the both sides of the line may detect the first type of detection data because the touch sensors are relatively close to couple with each other after the bendable flexible screen is bent, and the electrical parameters between different touch sensors are symmetrically distributed with the line as a reference. In other words, touch sensors at the both sides of the line with the same distance to the center of the bending area may detect approximately equal electrical parameters.

Therefore, in some embodiments of the present disclosure, when the difference between the electrical parameters of the touch sensors at the both sides of the line with the same distance to the line is within the first threshold range, that is, under a condition that the electrical parameters are approximately equal, the data detected by the touch sensors are more likely to be detection data obtained by bending the bendable flexible screen and generating the mutual coupling.

It should be noted that, the first threshold range may be adjusted based on a detection accuracy and a detection uniformity of the touch sensor of the bendable flexible screen. The smaller the first threshold range, the smaller the difference between the electrical parameters is when the distribution condition is met.

In this way, it may be determined whether the distribution condition is met based on the change tendency and the distribution rule of the electrical parameters detected by respective touch sensors on the bendable flexible screen. In this way, the coupled detection data may be distinguished from the detection data generated by the actual touch operation by only performing simply processing and analyzing the detection data of the touch sensor on the bendable flexible screen, and then the bending degree of the bendable flexible screen may be further determined based on various electrical parameters, thereby realizing the orientation detection of the electronic device.

In some embodiments, the method also includes: determining whether a touch operation acting on the bendable flexible screen is detected based on the electrical parameters in a case that the distribution of the electrical parameters on the bendable flexible screen fails to meet the distribution condition.

For example, when the difference between the electrical parameters is outside the first threshold range, it is determined whether the touch operation acting on the bendable flexible screen is detected based on the electrical parameters.

In some embodiments of the present disclosure, when the electrical parameters fail to meet the distribution condition, it means that the detection data detected by each touch sensor is not generated by the mutual coupling. For example, when the difference between the electrical parameters is outside the first threshold range, it means that there is a quite difference between the electrical parameters of the touch sensors, and monitoring data detected by respective touch sensors does not reflect a rule that the bendable flexible screen is bent to enable respective touch sensors to couple with each other.

Therefore, it may be determined whether the detected data is the detection data generated by the touching of the touch body, such as the second type of detection data, based on the electrical parameters and the coordinates of the corresponding touch sensors, thereby facilitating to report a coordinate and a gesture corresponding to the touch operation and realizing various operation functions of the electronic device.

Figure 2:
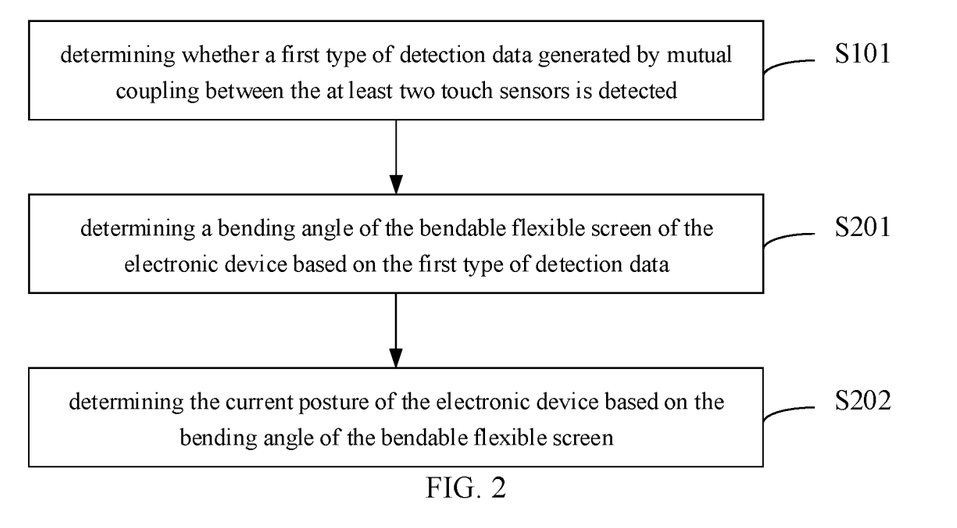
FIG. 2 is a flowchart illustrating a method for detecting an orientation of an electronic device according to some embodiments.

In some embodiments, as illustrated in FIG. 2, determining the current orientation of the electronic device based on the first type of detection data at block S102 includes the following.

At block S201, a bending angle of the bendable flexible screen of the electronic device is determined based on the first type of detection data.

At block S202, the current orientation of the electronic device is determined based on the bending angle of the bendable flexible screen.

In some embodiments of the present disclosure, the current orientation of the electronic device may include a spread state and a folding state, and may also include a bending state in which the screen is bent with an angle. Different couplings may be generated for the detection data of each touch sensor due to different bending degrees. Therefore, the bending angle of the bendable flexible screen may be correspondingly determined based on the first type of detection data, and then the current orientation of the electronic device may be determined.

For example, determining the bending angle based on the electrical parameter of the touch sensor includes: determining that the bending angle is greater than a first preset angle (such as 160°) when the electrical parameter is close to 0, and determining that the bending angle is within a second preset angle range (such as 60° to 120°) when the electrical parameter is greater than a predetermined threshold.

In this way, the bending angle may be determined based on the electrical parameter based on the first type of detection data detected by each touch sensor of the bendable flexible screen, such that the detection for various different orientations may be realized without being limited to the folding state and the spread state.

In some embodiments, determining the bending angle of the bendable flexible screen of the electronic device based on the first type of detection data includes: determining the bending angle based on a preset correspondence between the bending angle and an electrical parameter of at least one of the at least two touch sensors contained in the first type of detection data.

In some embodiments of the present disclosure, the bending angle may be determined by utilizing the electrical parameters of all the touch sensors on the bendable flexible screen, or by selecting the electrical parameters of some touch sensors. When the electronic device is in factory settings, a preset correspondence between the bending angle and the electrical parameter of each touch sensor may be determined in advance by experimental means or by a relationship between the capacitance and the distance. In this way, in the using procedure, the bending angle corresponding to the electrical parameter may be determined based on the preset correspondence.

In this way, a large amount of data processing is needed, and only the bending angle may be queried in the preset correspondence based on the data, such that the orientation of the electronic device may be quickly detected.

In some embodiments, the method also includes: determining an orientation change of the electronic device based on a change tendency of the first type of detection data.

In some embodiments of the present disclosure, not only the bending angle of the bendable flexible screen and the current orientation of the electronic device are determined based on the first type of detection data, but also the change tendency of the bending angle of the bendable flexible screen may also be determined based on the change tendency of the first type of detection data, such as the increasing or decreasing of the detection data, thereby determining the orientation change of the electronic device.

In this way, during using the electronic device, the respective functional components and displayed pictures may be adjusted correspondingly based on the orientation change of the electronic device. For example, when the orientation of the electronic device is switched from the folding state to the spread state, a brightness of the bendable flexible screen may be gradually improved, such that the user may feel a dynamic effect that the screen gradually lights up when the electronic device is turned on. For another example, when the orientation of the electronic device is switched from the spread state to the folding state, the brightness of the bendable flexible screen may be gradually reduced, and an auxiliary display screen located on the other side of the bendable flexible screen of the electronic device may also be turned on. In addition, various user instructions and somatosensory detection may be realized by detecting the orientation change of the electronic device.

In some embodiments, determining the orientation change of the electronic device based on the change tendency of the first type of detection data includes: determining that the bendable flexible screen is switched from a spread state to a folding state in a case that the electrical parameters included in the first type of detection data show an increasing tendency; and determining that the bendable flexible screen is switched from the folding state to the spread state in a case that the electrical parameters included in the first type of detection data show a decreasing tendency.

The first type of detection data is the detection data generated by the mutual coupling between the touch sensors of the bendable flexible screen, and the relative distance between the touch sensors is closer and the signal generated by the coupling is stronger when the bendable flexible screen is folded, but the relative distance between the touch sensors is farther and the signal generated by the coupling is weaker when the bendable flexible screen is spread. Therefore, the orientation change may be determined based on the change tendency of increasing or decreasing of the electrical parameters.

In some embodiments of the present disclosure, following examples are also provided.

In an example, a mobile phone with the foldable flexible screen may detect the spread action and folding action of the bendable flexible screen and the orientation of the mobile phone in a use procedure by utilizing a Hall sensor. The Hall sensor is composed of a magnetic sensor and a magnetic material, which are respectively placed at relative positions of two half screens of the bendable flexible screen. A relative position relationship between the two half screens of the bendable flexible screen may be determined by the magnetic sensor detecting a magnetic induction line generated by the magnetic material. However, the Hall sensor needs extra costs, and takes up internal space of the electronic device.

In another example, a gravity sensor and a gyroscope sensor may be employed to implement the orientation detection on the mobile phone with the foldable flexible screen. Two groups of gravity sensors and gyroscope sensors are placed in two relatively foldable parts to detect gravity components and motion components in different directions, thereby realizing the orientation detection. Similar to the Hall sensor, in this way, an extra sensor is also needed, the internal space of the electronic device is occupied, and the processing of the detection data is complicated, which is not conducive to the accuracy of the orientation detection.

In embodiments of the present disclosure, the function of the touch detection of the bendable flexible screen may detect the spread orientation or bending orientation of the bendable flexible screen, such that no additional sensor is needed for the orientation detection, and the occupation for the internal space of the electronic device is reduced while cost is saved.

In the embodiments of the present disclosure, the orientation and the action of spreading or bending the bendable flexible screen may be determined by utilizing the change and the change tendency of the capacitance signal detected by the touch sensor of the bendable flexible screen.

Figure 3:
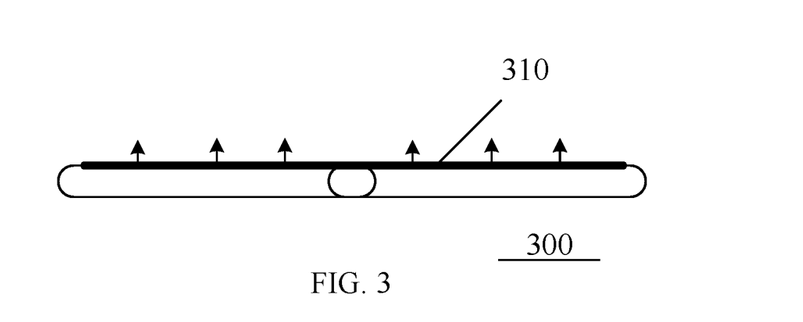
FIG. 3 is a schematic diagram illustrating a spread state of an electronic device according to some embodiments.

As illustrated in FIG. 3, the electronic device 300 is in the spread state. A range above a surface of a bendable flexible screen 310 on the electronic device 300 is air, such that the signal detected by the touch sensor is a bottom noise of the touch sensor, that is, a capacitance value of the touch sensor.

Figure 4:
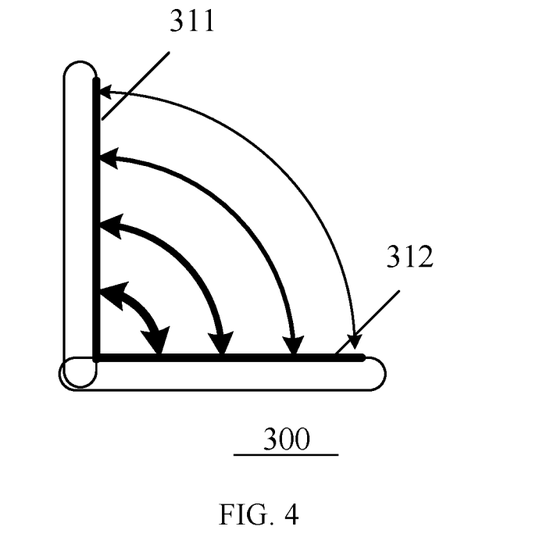
FIG. 4 is a schematic diagram illustrating a bending state of an electronic device according to some embodiments.

As illustrated in FIG. 4, when the bendable flexible screen 310 is bent such that the electronic device is in the bending state, a coupling signal is generated between a left half screen 311 and a right half screen 312 of the bendable flexible screen 310, which is detected by the left half screen 311 and the right half screen 312 respectively. Meanwhile, when the electronic device is in the bending state, the larger the distance between the touch sensors, the smaller the coupling signal is. Therefore, a signal strength near the rotation shaft is stronger, while a signal strength near an edge and away from the rotation shaft is weaker (a thickness of an arrow arc represents a detected signal strength).

Figure 5:
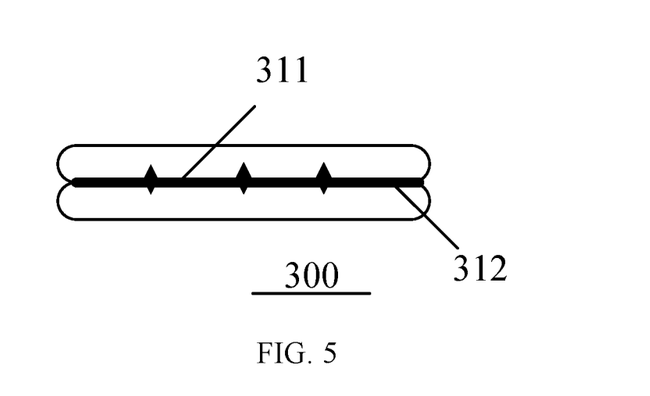
FIG. 5 is a schematic diagram illustrating a folding state of an electronic device according to some embodiments.

As illustrated in FIG. 5, when the bendable flexible screen 310 is bent until the left half screen 311 and the right half screen 312 are folded with each other, that is, the electronic device is in a closed state. Each touch sensor on the bendable flexible screen may detect a maximum signal strength.

In some embodiments of the present disclosure, the electrical parameters (such as capacitance values) corresponding to the detection signals may be determined based on coupled detection signals detected by respective touch sensors when the orientation of the bendable flexible screen is in various bending angles. In this way, in the using procedure, the bending angle of the bendable flexible screen may be correspondingly determined based on the detection signal. In addition, it may be determined whether the orientation of the electronic device is in a procedure of switching from the spread state to the folding state or from the folding state to the spread state based on the change tendency of the detection signal.

Figure 6:
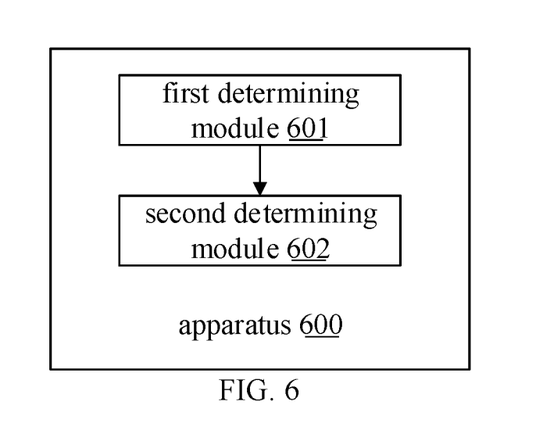
FIG. 6 is a block diagram illustrating an apparatus for detecting an orientation of an electronic device according to some embodiments.

FIG. 6 is a block diagram illustrating an apparatus for detecting an orientation of an electronic device according to some embodiments. The apparatus is applied to an electronic device with a bendable flexible screen. The bendable flexible screen includes a touch array. The touch array includes at least two touch sensors. As illustrated in FIG. 6, the apparatus 600 includes: a first determining module 601 and a second determining module 602. The first determining module 601 is configured to determine whether a first type of detection data generated by mutual coupling between the at least two touch sensors is detected. The second determining module 602 is configured to determine a current orientation of the electronic device based on the first type of detection data.

In some embodiments, the first determining module includes a first determining sub-module and a second determining sub-module. The first determining sub-module is configured to determine whether a distribution of electrical parameters generated by different touch sensors on the bendable flexible screen meets a distribution condition. The second determining sub-module is configured to determine that the first type of detection data is detected in a case that the distribution of electrical parameters generated by different touch sensors on the bendable flexible screen meets the distribution condition.

In some embodiments, the first determining sub-module includes: a first determining unit and a second determining unit. The first determining unit is configured to determine whether a change tendency of the electrical parameters is symmetrically distributed in a predetermined pattern based on electrical parameters of any adjacent touch sensors. The predetermined pattern includes a line through two edges of the bendable flexible screen. The second determining unit is configured to determine that the distribution of the electrical parameters on the bendable flexible screen meets the distribution condition in a case that the change tendency of the electrical parameters is symmetrically distributed in the predetermined pattern.

In some embodiments, the second determining unit is configured to: in a case that the change tendency of the electrical parameters is symmetrically distributed in the predetermined pattern, and a difference between electrical parameters of touch sensors with a same distance to the line is within a first threshold range, determine that the distribution of the electrical parameters on the bendable flexible screen meets the distribution condition.

In some embodiments, the apparatus also includes: a third determining module, configured to determine whether a touch operation acting on the bendable flexible screen is detected based on the electrical parameters in a case that the distribution of the electrical parameters on the bendable flexible screen fails to meet the distribution condition.

In some embodiments, the second determining module includes: a third determining sub-module and a fourth determining sub-module. The third determining sub-module is configured to determine a bending angle of the bendable flexible screen of the electronic device based on the first type of detection data. The fourth determining sub-module is configured to determine the current orientation of the electronic device based on the bending angle of the bendable flexible screen.

In some embodiments, the third determining sub-module is configured to: determine the bending angle based on a preset correspondence between the bending angle and an electrical parameter of at least one of the at least two touch sensors contained in the first type of detection data.

In some embodiments, the apparatus also includes: a fourth determining module, configured to determine an orientation change of the electronic device based on a change tendency of the first type of detection data.

In some embodiments, the fourth determining module includes: a fifth determining sub-module and a sixth determining sub-module. The fifth determining sub-module is configured to determine that the bendable flexible screen is switched from a spread state to a folding state in a case that the electrical parameters included in the first type of detection data show an increasing tendency. The sixth determining sub-module is configured to determine that the bendable flexible screen is switched from the folding state to the spread state in a case that the electrical parameters included in the first type of detection data show a decreasing tendency.

With regard to the apparatus in the above embodiments, the detailed implementation of each module performing operations is described in detail in the embodiments related to the method, and may not be elaborated in detail here.

Figure 7:
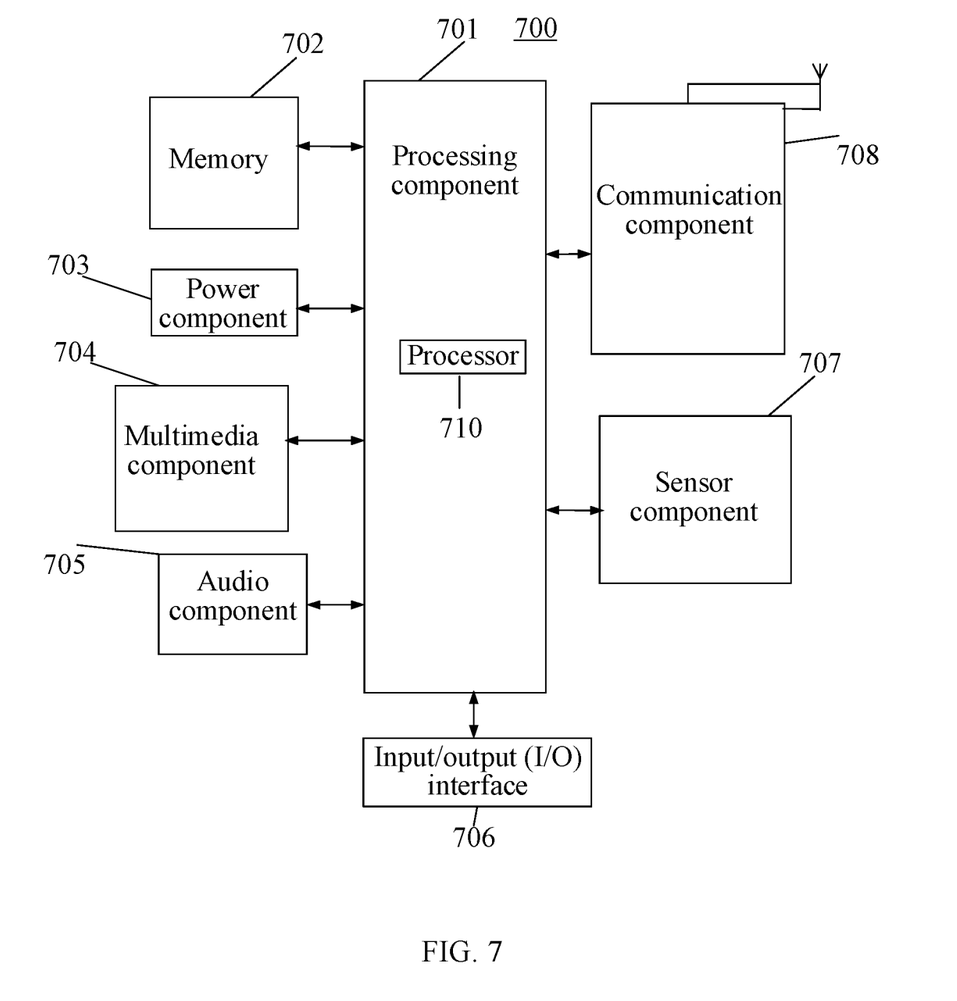
FIG. 7 is a block diagram illustrating an electronic device according to some embodiments.

FIG. 7 is a block diagram illustrating an electronic device 700 according to some embodiments. For example, the electronic device 700 may be a mobile phone, a computer, a digital broadcasting terminal, a message sending and receiving equipment, a game controller, a tablet device, a medical device, a fitness equipment, a personal digital assistant or the like.

As illustrated in FIG. 7, the electronic device 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the electronic device 700, such as the operations associated with display, telephone calls, data communications, camera operations, and recording operations. The processing component 701 may include one or more processors 710 to execute instructions to perform all or part of the steps in the above described methods. Moreover, the processing component 701 may include one or more modules which facilitate the interaction between the processing component 701 and other components. For example, the processing component 701 may include a multimedia module to facilitate the interaction between the multimedia component 704 and the processing component 701.

The memory 702 is configured to store various types of data to support the operation of the electronic device 700. Examples of such data include instructions, contraction data, phonebook data, messages, pictures, video, etc for any applications or methods operated on the electronic device 700. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 is configured to provide power to various components of the electronic device 700. The power component 703 may include a power management system, one or more power sources, and any other components associated with the generation, management, and distribution of power in the electronic device 700.

The multimedia component 704 includes a screen for providing an output interface between the electronic device 700 and the user. In some embodiments, the screen may include a liquid crystal display (LCD) and a touch panel (TP). In some embodiments, an organic light-emitting diode (OLED) display can be employed.

If the screen includes the touch panel, the screen may be implemented as a touch screen to receive an input signal from the user. The touch panel includes one or more touch sensors to sense touches, swipes, and gestures on the touch panel. The touch sensor may not only sense a boundary of a touch or swipe action, but also sense a period and a pressure associated with the touch or swipe action. In some embodiments, the multimedia component 704 includes a front camera and/or a rear camera. The front camera and/or the rear camera may receive an external multimedia datum while the electronic device 700 is in an operation mode, such as a photographing mode or a video mode. Each of the front camera and the rear camera may be a fixed optical lens system or have focus and optical zoom capability.

The audio component 705 is configured to output and/or input an audio signal. For example, the audio component 705 includes a microphone ("MIC") configured to receive an external audio signal when the electronic device 700 is in the operation mode, such as a call mode, a recording mode, and a voice recognition mode. The received audio signal may be further stored in the memory 702 or transmitted via the communication component 708. In some embodiments, the audio component 705 also includes a speaker for outputting audio signals.

The I/O interface 706 is configured to provide an interface between the processing component 701 and peripheral interface modules. The peripheral interface module may be such as a keyboard, a click wheel, buttons, and the like. The buttons may include, but be not limited to, a home button, a volume button, a starting button, and a locking button.

The sensor component 707 includes one or more sensors for providing state assessments of various aspects of the electronic device 700. For example, the sensor component 707 may detect an open/closed state of the electronic device 700, relative positioning of components, e.g., the display and the keypad of the electronic device 700, a change in position of the electronic device 700 or a component of the electronic device 700, a presence or absence of the user contraction with the electronic device 700, an orientation or an acceleration/deceleration of the electronic device 700, and a change in temperature of the electronic device 700. The sensor component 707 may include a proximity sensor configured to detect the presence of nearby objects without any physical contact. The sensor component 707 may also include a light sensor, such as a CMOS (complementary metal-oxide-semiconductor)) or a CCD (charge coupled device) image sensor, for using in an imaging application. In some embodiments, the sensor component 707 may also include an accelerometer sensor, a gyroscope sensor, a magnetic sensor, a pressure sensor, or a temperature sensor.

The communication component 708 is configured to facilitate a wired or wireless communication between the electronic device 700 and other devices. The electronic device 700 may access a wireless network based on a communication standard, such as Wi-Fi, 2G, 3G, 4G, or 5G, or a combination thereof. In some embodiments, the communication component 708 receives a broadcast signal or broadcast associated information from an external broadcast management system via a broadcast channel. In some embodiments, the communication component 708 also includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the electronic device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 702 including instructions. The above instructions may be executed by the processor 710 in the electronic device 700 for performing the above methods. For example, the non-transitory computer-readable storage medium may be a ROM, a RAM, a CD-ROM, a magnetic tape, a floppy disc, an optical data storage device, and the like.

When the instructions in the storage medium are executed by a processor or processing circuit of a mobile terminal, the mobile terminal is caused to execute operations of the methods according to any of the above embodiments.

Various embodiments of the present disclosure can have one or more of the following advantages.

Using the touch detection function of the flexible screen of the electronic apparatus itself, the orientation of the electronic device can be determined by the sensing signals generated by the mutual coupling between the multiple touch sensors on the flexible screen under different bending states.

On the one hand, various embodiments of the present disclosure do not require additional dedicated sensors for orientation detection in the electronic apparatus, thereby saving cost and reducing internal space of the electronic apparatus, and facilitating a slim design of the apparatus.

On the other hand, various embodiments of the present disclosure take into account that the orientation change of the electronic apparatus corresponds to the bending of the flexible screen. Therefore, compared with the orientation detection using a gravity sensor or the like, it is more in line with the principle of the actual orientation change of the electronic device, and more accurate detection results can be obtained.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for detecting an orientation of an electronic device, applicable to an electronic device with a bendable flexible screen, wherein the bendable flexible screen comprises a touch array, the touch array comprises at least two touch sensors, and the method comprises:
    determining that a first type of detection data generated by mutual coupling between the at least two touch sensors is detected by determining that a distribution of electrical parameters generated by different touch sensors on the bendable flexible screen meets a distribution condition in a case that a change tendency of the electrical parameters is symmetrically distributed in a predetermined pattern, and a difference between electrical parameters of touch sensors with a same distance to a line through two edges of the bendable flexible screen comprised in the predetermined pattern is within a first threshold range; and
    determining a current orientation of the electronic device based on the first type of detection data.

2. The method of claim 1, wherein the method further comprises:
    determining whether a touch operation acting on the bendable flexible screen is detected based on the electrical parameters in a case that the distribution of the electrical parameters on the bendable flexible screen fails to meet the distribution condition.

3. The method of claim 1, wherein the determining the current orientation of the electronic device based on the first type of detection data comprises:
    determining a bending angle of the bendable flexible screen of the electronic device based on the first type of detection data; and
    determining the current orientation of the electronic device based on the bending angle of the bendable flexible screen.

4. The method of claim 3, wherein the determining the bending angle of the bendable flexible screen of the electronic device based on the first type of detection data comprises:
    determining the bending angle based on a preset correspondence between the bending angle and an electrical parameter of at least one of the at least two touch sensors contained in the first type of detection data.

5. The method of claim 1, further comprising:
    determining an orientation change of the electronic device based on a change tendency of the first type of detection data.

6. The method of claim 5, wherein the determining the orientation change of the electronic device based on the change tendency of the first type of detection data comprises:
    determining that the bendable flexible screen is switched from a spread state to a folding state in a case that the electrical parameters comprised in the first type of detection data show an increasing tendency; and
    determining that the bendable flexible screen is switched from the folding state to the spread state in a case that the electrical parameters comprised in the first type of detection data show a decreasing tendency.

7. An apparatus for detecting an orientation of an electronic device, applicable to an electronic device with a bendable flexible screen, wherein the bendable flexible screen comprises a touch array, the touch array comprises at least two touch sensors, and the apparatus comprises a non-transitory computer-readable medium including computer-executable instructions stored thereon, and an instruction execution system which is configured by the instructions to implement:
    a first determining circuit, configured to determine that a first type of detection data generated by mutual coupling between the at least two touch sensors is detected by determining that a distribution of electrical parameters generated by different touch sensors on the bendable flexible screen meets a distribution condition in a case that a change tendency of the electrical parameters is symmetrically distributed in a predetermined pattern, and a difference between electrical parameters of touch sensors with a same distance to a line through two edges of the bendable flexible screen comprised in the predetermined pattern is within a first threshold range; and
    a second determining circuit, configured to determine a current orientation of the electronic device based on the first type of detection data.

8. The apparatus of claim 7, wherein the instruction execution system is further configured by the instructions to implement:
    a third determining circuit, configured to determine whether a touch operation acting on the bendable flexible screen is detected based on the electrical parameters in a case that the distribution of the electrical parameters on the bendable flexible screen fails to meet the distribution condition.

9. The apparatus of claim 7, wherein the second determining circuit comprises:

a third determining sub-circuit, configured to determine a bending angle of the bendable flexible screen of the electronic device based on the first type of detection data; and a fourth determining sub-circuit, configured to determine the current orientation of the electronic device based on the bending angle of the bendable flexible screen.

10. The apparatus of claim 9, wherein the third determining sub-circuit is configured to:

determine the bending angle based on a preset correspondence between the bending angle and an electrical parameter of at least one of the at least two touch sensors contained in the first type of detection data.

11. The apparatus of claim 7, wherein the instruction execution system is further configured by the instructions to implement:

a fourth determining circuit, configured to determine an orientation change of the electronic device based on a change tendency of the first type of detection data;

wherein the fourth determining circuit comprises:

a fifth determining sub-circuit, configured to determine that the bendable flexible screen is switched from a spread state to a folding state in a case that the electrical parameters comprised in the first type of detection data show an increasing tendency; and a sixth determining sub-circuit, configured to determine that the bendable flexible screen is switched from the folding state to the spread state in a case that the electrical parameters comprised in the first type of detection data show a decreasing tendency.

12. A non-transitory computer readable storage medium having computer executable instructions stored thereon, wherein when the computer executable instructions are executed by a processor, the processor is caused to implement a method for detecting an orientation of an electronic device, the method is applicable to an electronic device with a bendable flexible screen, the bendable flexible screen comprises a touch array, the touch array comprises at least two touch sensors, and the method comprises:

determining that a first type of detection data generated by mutual coupling between the at least two touch sensors is detected by determining that a distribution of electrical parameters generated by different touch sensors on the bendable flexible screen meets a distribution condition in a case that a change tendency of the electrical parameters is symmetrically distributed in a predetermined pattern, and a difference between electrical parameters of touch sensors with a same distance to a line through two edges of the bendable flexible screen comprised in the predetermined pattern is within a first threshold range; and determining a current orientation of the electronic device based on the first type of detection data.

* * * * *